United States Patent [19]
Zweigart

[11] Patent Number: 5,284,376
[45] Date of Patent: Feb. 8, 1994

[54] MOTOR VEHICLE WINDSCREEN HAVING STRIP-SHAPED OPAQUE DOT PATTERN

[75] Inventor: Gernard Zweigart, Aidlingen, Fed. Rep. of Germany

[73] Assignee: Mercedes-Benz AG, Fed. Rep. of Germany

[21] Appl. No.: 779,252

[22] Filed: Oct. 18, 1991

[30] Foreign Application Priority Data

Oct. 19, 1990 [DE] Fed. Rep. of Germany ....... 4033188

[51] Int. Cl.$^5$ .............................................. B60J 3/00
[52] U.S. Cl. .................... 296/96.19; 359/614
[58] Field of Search ............... 296/96.19, 97.1, 97.2; 359/608, 614, 885, 888, 893

[56] References Cited

U.S. PATENT DOCUMENTS

| | | | |
|---|---|---|---|
| 2,636,420 | 4/1953 | Ryan et al. | 296/96.19 X |
| 3,526,402 | 10/1970 | Aston | 359/888 X |
| 4,940,273 | 7/1990 | Konishi | 296/97.6 |
| 4,958,879 | 9/1990 | Gillum | 296/97.6 |

FOREIGN PATENT DOCUMENTS

| | | | |
|---|---|---|---|
| 91276 | 10/1983 | European Pat. Off. | 296/97.2 |
| 1372833 | 8/1964 | France | 296/97.2 |
| 1383104 | 11/1964 | France | 359/888 |
| 1045160 | 10/1966 | United Kingdom | 296/97.2 |

Primary Examiner—David M. Mitchell
Assistant Examiner—Andrew C. Pike
Attorney, Agent, or Firm—Evenson, McKeown, Edwards & Lenahan

[57] ABSTRACT

As a replacement for a swivellable third sun visor which fills the free space between, on one hand, two folded-down sun visors and, on the other hand, the rear-view mirror and the roof lining, a shade arranged on the windscreen adjoins an opaque strip mounted at the top of the windscreen and is constructed as an evenly distributed dot pattern to improve the screening from dazzling sun rays. The diameter of the dots in the pattern and their mutual spacing are dimensioned such that, relative to the region covered by the evenly distributed dot pattern, the total viewing area remaining free is still about 10%.

4 Claims, 1 Drawing Sheet

MOTOR VEHICLE WINDSCREEN HAVING STRIP-SHAPED OPAQUE DOT PATTERN

BACKGROUND AND SUMMARY OF THE INVENTION

The present invention relates to a motor vehicle windscreen and more particularly, to a windscreen upper edge is provided with an opaque strip adjoined by a strip-shaped pattern, consisting of opaque dots. The dots have a diameter which is reduced increasingly towards the center of the windscreen spaced-apart hinged sun visors being provided on the inside of the windscreen. The portion between the folded-down sun visors and bounded at the bottom by the projection of the top edge of the rearview mirror is covered by a further shade.

Motor vehicles with a device for protecting the driver and passenger from dazzling sunlight are generally known. The additional shade in the region between the two swivellable sun visors is constructed as a swivellable shade arranged above the rearview mirror. For reasons of tolerance alone, it is not possible for this third shade to adjoin the folded-down sun visor and the rearview mirror without gaps in its position of use. As a result, depending on the incident sun rays, disturbances of vision can still occur. Additionally, with the third shade folded down, it is difficult to have road signs and traffic lights, which are placed in high positions at the side of the road, in the field of view without changing position.

Although it is already known through European Patent Application 091,776 to provide an upper strip extending over the entire width of the windscreen, with a dot pattern as a substitute for sun visors, the two regions arranged one above the other are formed with a transparent area which becomes increasingly free in each case from the top to the bottom. Thus, despite a permanent shielding in the case of intense incident sun rays, there is no guarantee that the dazzle effect will be prevented.

An object of the present invention is to construct an additional shade, without impairing the appearance of the motor vehicle, with simple means in manufacturing terms such that, despite a sufficient possibility of observation, there is no dazzle effect in all possible angles of incidence of the sun's rays.

This object has been achieved in a windscreen according to the present invention by providing a shape configured as an evenly distributed dot pattern whose mutual spacing is dimensioned such that, relative to the region covered by the dot pattern, the total free viewing area is about ten percent.

Even if the sun visor is not completely folded down, no dazzle effect will occur if the region taken up by the evenly distributed dot pattern is larger than the portion formed between the folded-down sun visors on the one hand and the edge-side strip and the projection of the top edge of the rearview mirror on the other hand, with the result that there is overlapping towards the folded-down sun visors and the rearview mirror.

In further embodiment of the present invention for improved incorporation into the adjoining upper windscreen regions, the evenly distributed dot pattern is bounded by the peripheral strip-shaped dot pattern having a dot diameter decreasing towards the center of the windscreen, as well as by the top strip.

BRIEF DESCRIPTION OF THE DRAWINGS

These and other objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
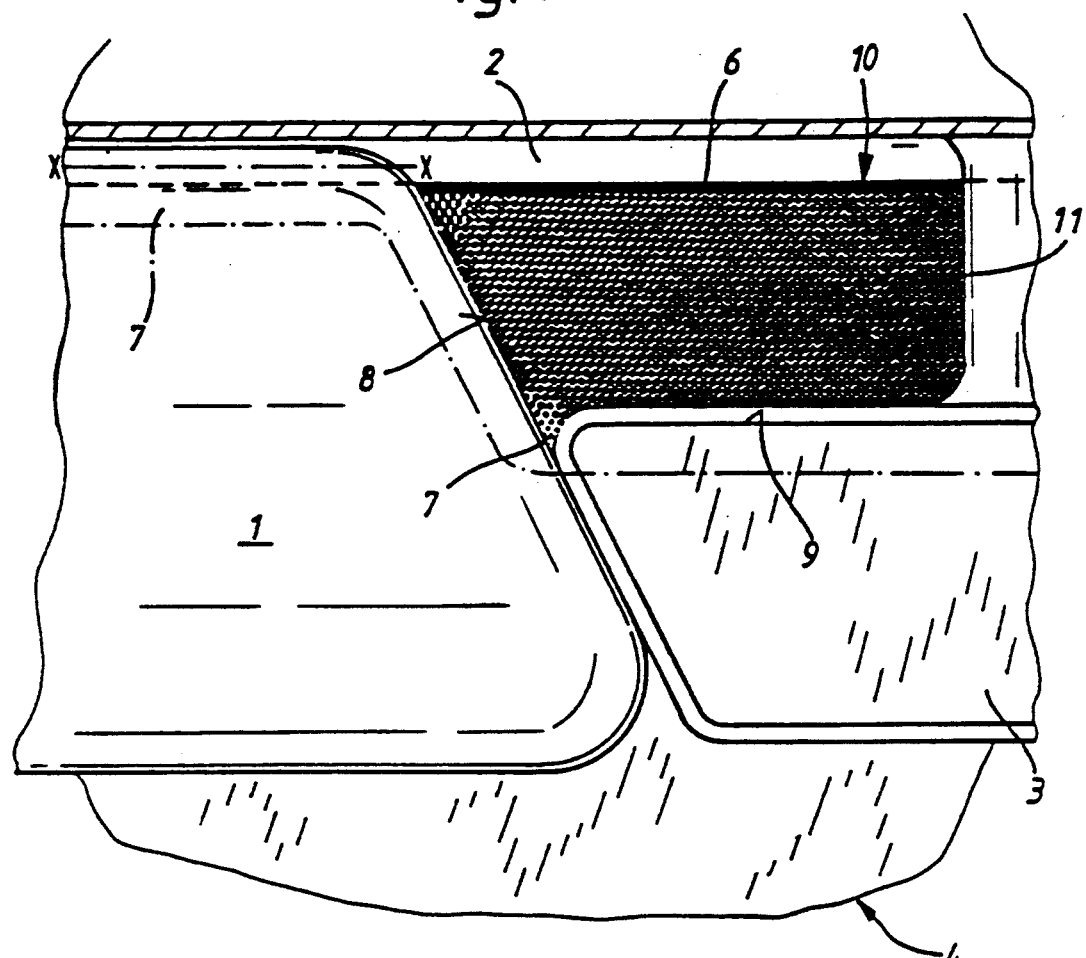
FIG. 1 is a partial view of the top region of the windscreen with the left sun visor folded down.

A motor vehicle (not illustrated in detail) is fitted with sun visors each assigned to the driver and passenger and swivellable about an axis X—X. Only the sun visor 1, which is folded down on the driver's side, is, however, visible in FIG. 1. It is, of course, understood that the sun visor on the passenger's side is a mirror image of the visor on the driver's side in the conventional manner. The sun visor 1 is mounted so as to be swivellable in a conventional manner (not shown) on a lining 2 on the vehicle roof which also accommodates a rearview mirror 3. A windscreen 4, mounted in front of the sun visor 1 and the rearview mirror 3, has at its top edge 5 an opaque strip 6 applied by a known screen printing method to cover its attachment to the bodywork and to cover the lining 2. Adjoining the strip 6 is a dot pattern 7, applied together with the strip 6. The dots of the pattern have a diameter which decreases towards the center of the windscreen 4.

A region which is not covered when the sun visors 1 are folded down and is bounded by the side edges 8 of the sun visors 1, the strip 6 and the projection of the top edge 9 of the rearview mirror 3 is covered by a fixed shade 10 on the windscreen, which shade is constructed as another dot pattern 11 with evenly distributed dots 12 adjoining the opaque strip 6. The diameter of the individual dots 12 and their mutual spacing are dimensioned such that, relative to the region covered by the evenly distributed dot pattern 11, which is bounded as described above, the total viewing area remaining free is still about 10%.

Figure 2:
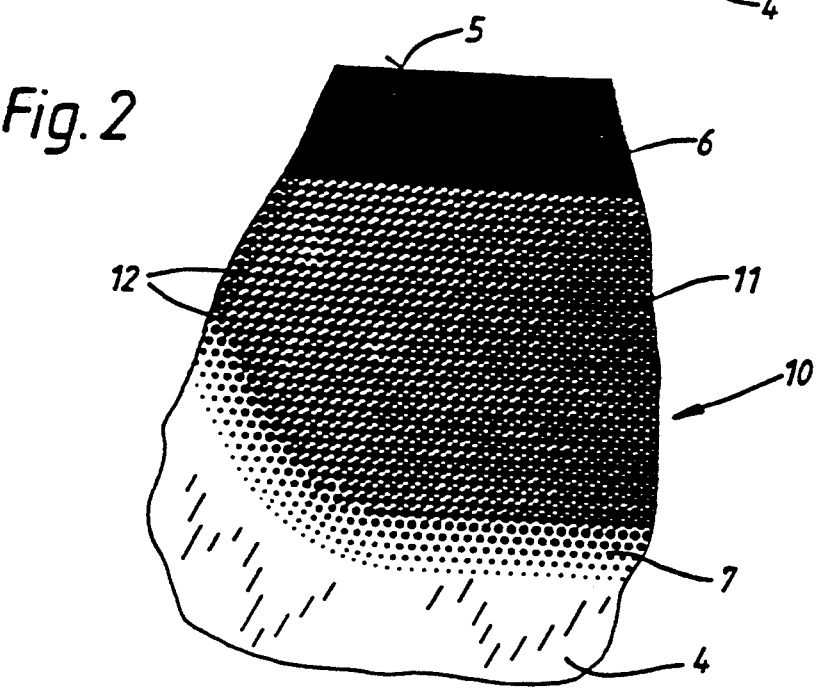
FIG. 2 is an enlarged view of a partial region of the shade on the windscreen shown in FIG. 1.

It has been discovered that this ten percent value provides, on one hand, adequate protection from dazzling sun rays, but allows observation of the upper traffic space. Consequently, among other things, the change in the lights of traffic lights mounted at a high level is clearly perceived. As shown in FIG. 2, the dot pattern 11 is bounded by the peripheral dot pattern 7 having a dot diameter decreasing towards the center of the windscreen 4, as well as by the strip 6. Accordingly, a harmonious appearance results which is matched to the adjoining windscreen region. The expenditure for implementing the shade 10 can be kept low if it is applied to the windscreen 4, together with the strip 6 and the dot pattern 7, in one operation by a known screen printing operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A motor vehicle windscreen comprising an opaque strip provided at an upper edge of the windscreen, a strip-shaped dot pattern adjoining the opaque strip and comprising opaque dots having a diameter reduced increasingly towards a center portion of the windscreen, hinged sun visors on an inside of the windscreen, and a further shade being provided in a region between the sun visors when folded down, which region is bounded at a bottom by a projection of a top edge of a rearview mirror, wherein the further shade is an evenly distributed dot pattern with mutual dot spacing dimensioned such that, relative to the region covered by the evenly distributed dot pattern, a total free viewing area is about 10%.

2. The windscreen according to claim 1, wherein the area taken up by the evenly distributed dot pattern is larger than the region formed between the folded-down sun visors, the strip and the projection of the top edge of the rearview mirror sufficient to provide overlapping towards the folded-down sun visors and the rearview mirror.

3. The windscreen according to claim 1, wherein the evenly distributed dot pattern is bounded by the strip-shaped dot pattern consisting of dots whose diameter decreases toward the center portion of the windscreen and by the strip at the upper edge.

4. The windscreen according to claim 3, wherein the area taken up by the evenly distributed dot pattern is larger than the region formed between the folded-down sun visors, the strip, and the projection of the top edge of the rearview mirror sufficient to provide overlapping towards the folded-down sun visors and the rearview mirror.

* * * * *